Feb. 16, 1965 R. F. SCHREITMUELLER 3,170,157
RECEIVER NOISE COMPENSATION SYSTEM
Filed June 3, 1957 3 Sheets-Sheet 3
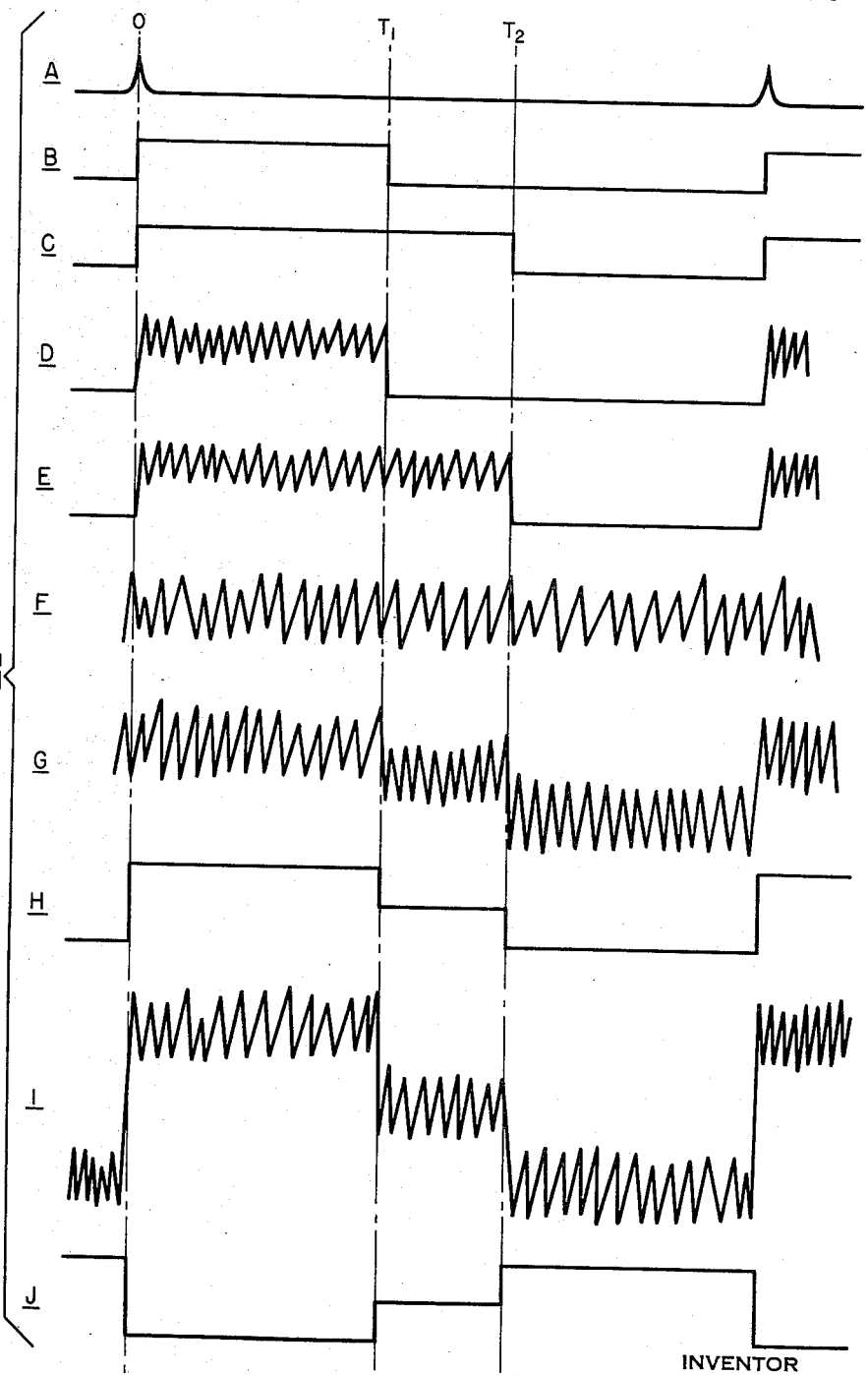
INVENTOR
RUDOLPH F. SCHREITMUELLER
BY
ATTORNEY

United States Patent Office 3,170,157
Patented Feb. 16, 1965

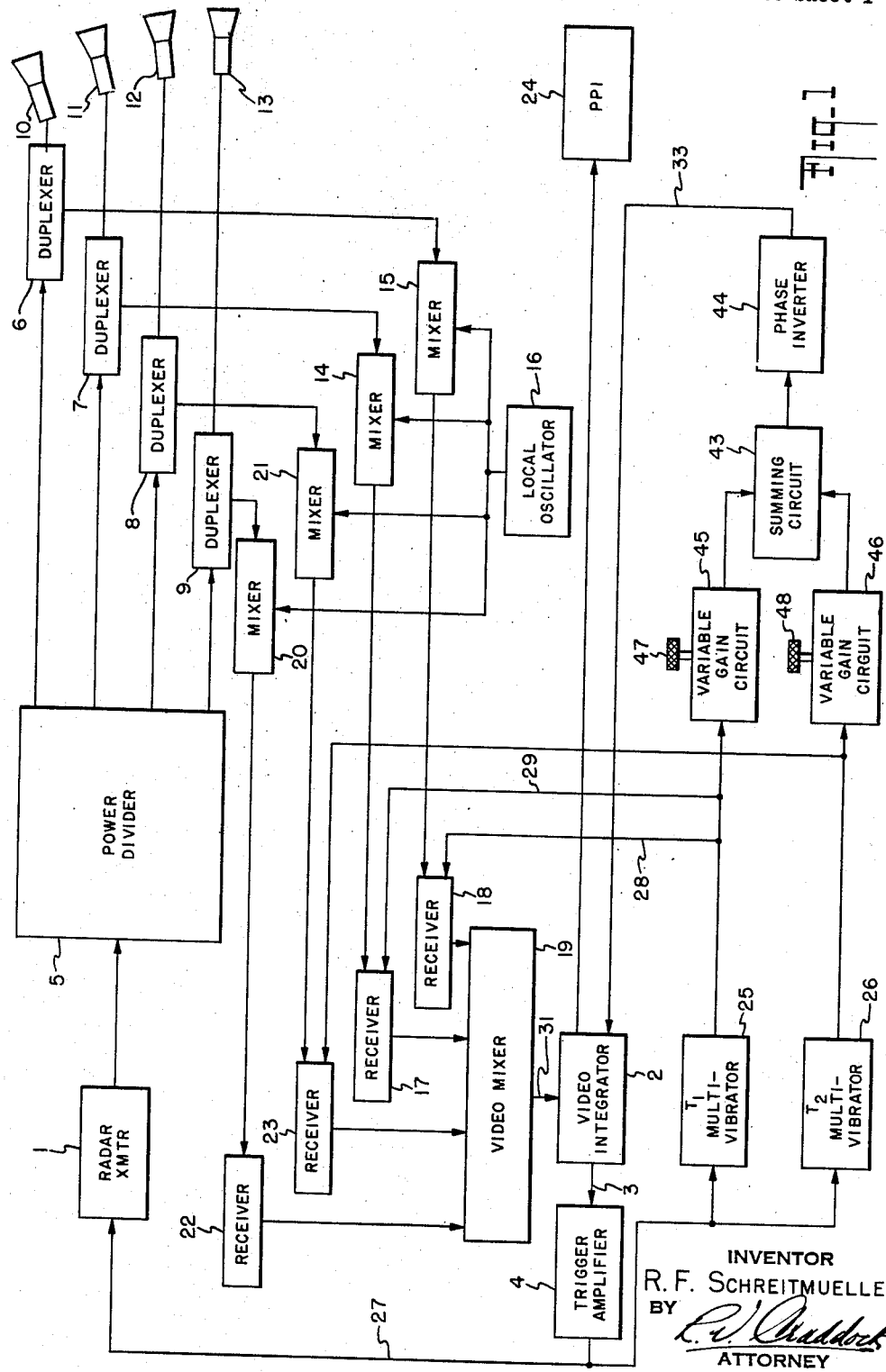

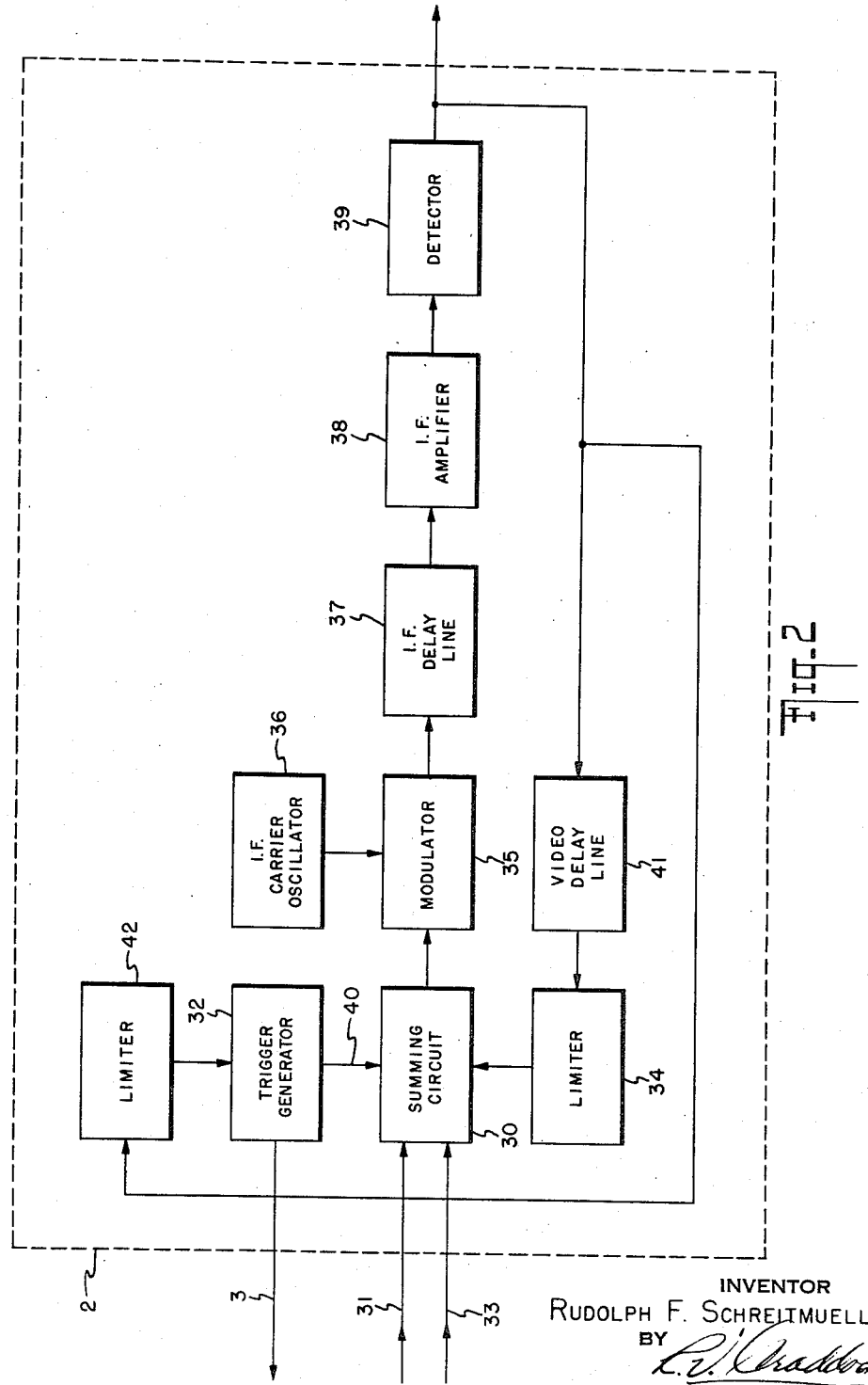

3,170,157
RECEIVER NOISE COMPENSATION SYSTEM
Rudolph F. Schreitmueller, Hempstead, N.Y., assignor to Sperry Rand Corporation, a corporation of Delaware
Filed June 3, 1957, Ser. No. 664,878
7 Claims. (Cl. 343—17.1)

The invention relates to signal receivers and, more particularly, to receivers for use in a stacked-beam radar system wherein said receivers are operative over different time peiods within the radar repetition interval.

One widely recognized application for stacked-beam radar systems, is in the determination of three dimensional target data, i.e., range, azimuth, and height. In such systems, the signal beams are arranged to lie one above the other in a vertical plane. Additionally, each of the stacked beams is oriented at a different angle within said vertical plane. Target height data is determined by comparing the target signal intensities in the receivers corresponding to adjacent beams. By a process of signal amplitude interpolation, the target elevation angle may be accurately computed.

Inasmuch as each of the stacked beams assumes a different elevation angle, it has been the practice in the art to deactivate the higher elevation angle receivers for a portion of each target reception interval leaving only the receivers corresponding to the lower elevation angle beams energized for substantially the entire target reception interval. Thus, following the emission of a pulse simultaneously transmitted in all beams, all the receivers are first energized. Then, as time increases within the same radar repetition interval, one or more of the higher angle receivers will be gated off leaving only one or more of the lower angle receivers continuously energized for the duration of the target reception interval. One of the purposes served in gating the stacked-beam receivers in the manner described is to avoid the noise contribution of the higher angle receivers during that long-range portion of the radar repetition interval wherein distant targets are to be received and when the higher angle receivers would yield no useful data.

In the prior art, the video outputs of the several stacked receivers are summed together so that their resultant output may be displayed, for example, on a PPI. Experience has shown, however, that an objectionable stepped waveform is superimposed on the target signals, which stepped waveform may severely burden the inherently limited dynamic range of the PPI. The stepped waveform is produced when the noise generated and detected in each of the time-gated receivers is summed together along with the desired target signals prior to application of the signals to the intensity modulation input of the PPI.

It is the principal object of the present invention to provide an improved receiver for use in stacked-beam radar systems whereby the dynamic range of the average value of the resultant target signals plus noise is kept to a minimum.

Another object is to provide target signal detection apparatus for a stacked-beam radar receiver wherein the average noise amplitude accompanying target signals is substantially constant as a function of target range.

A further object is to substantially eliminate any undesirable noise-produced average signal-level shifting in a stacked-beam radar receiver as a function of target range.

These and other objects of the present invention, as will more fully appear upon a reading of the following specification, are achieved by the provision, in a stacked-beam radar receiver, of a compensation waveform generator for producing a stepped output waveform whose component amplitudes are related to target range and whose individual steps correspond in time duration to the gating intervals of the various receivers included in the stacked-beam radar system. Common means are provided for gating the various stacked-beam receivers and for generating the compensating stepped waveform. Video signal summation means are also provided for differentially combining the resultant video signal output of the stacked-beam receivers with the compensating stepped waveform. There is thus produced at the output of the video summation means a signal, suitable for application to the intensity modulation input of the PPI, which is substantially free of noise-produced average signal-level shifting as a function of target range.

For a more complete understanding of the present invention, reference should be had to the following specification and to the appended figures of which:

FIG. 1 is a block diagram of an illustrative embodiment of the present invention;

FIG. 2 is a block diagram showing the details of a video integrator for use in the apparatus of FIG. 1; and FIG. 3 is a series of waveforms useful in explaining the operation of the apparatus of FIG. 1.

In FIG. 1, a radar transmitter is generally represented by the numeral 1. The radar transmitter is pulsed by a trigger generator contained within video integrator 2 which is shown in detail in FIG. 2. The trigger output of integrator 2 is applied via line 3 to trigger amplifier 4 and thence to the modulation input of transmitter 1.

The output of transmitter 1 is coupled by means of conventional power divider 5 in suitable power ratios to duplexers 6, 7, 8, and 9. The transmitted signals are then radiated by horns 10, 11, 12, and 13 for target irradiation. As a practical matter, the total transmitter power available at the output of divider 5 is so distributed between horns 10, 11, 12, and 13 that the long-range, lower elevation angle horns (for example, horns 12 and 13) receive a greater percentage thereof than do the higher elevation angle horns (for example, 10 and 11). A target signal is received by one or two of the horns 10, 11, 12, and 13 depending on the orientation of the target in space relative to the angular position of the horn axes. Assuming, for example, that a distant target echo signal is received by the low elevation angle horns 12 and 13, such signals are diverted by duplexers 8 and 9 to mixers 21 and 20, respectively, wherein they are heterodyned with the output of local oscillator 16.

The resultant I-F signal outputs from mixers 21 and 20 are applied to respectively associated receivers 23 and 22. Receivers 23 and 22 are assumed to include provision for I-F and video amplification and video detection. The detected video outputs of receivers 23 and 22 are combined in video mixer 19 and then applied to the input of video integrator 2. Mixers 14 and 15 and associated receivers 17 and 18 correspond in structure and operation to the above described mixers 21 and 20 and receivers 23 and 22.

Video integrator 2 is provided, in the illustrative embodiment of FIG. 1, to enhance the response to those video signals which occur coherently with the basic radar repetition rate relative to the response to noise and to signals having a repetition rate random with respect to that of the radar system. The enhanced signal output of integrator 2 is applied to the intensity control input of PPI 24.

As previously mentioned, the individual receivers corresponding to the horns producing the stacked beam of the radar system are rendered operative over different portions of each radar repetition interval. The necessary gating waveforms for energizing receivers 23, 17, and 18 are produced by multivibrators 25 and 26, both of which derive trigger inputs from the output of amplifier 4.

In FIG. 3, waveform A represents one cycle of the transmitter trigger that appears on line 27. Multivibrators 25 and 26 are preferably of the "single shot" type whereby they produce an output wave form whose leading edge is time coherent with the occurrence of the transmitter trigger and whose trailing edge occurs a predetermined length of time thereafter.

Waveform B illustrates the output waveform of multivibrator 25 as applied via lines 28 and 29 to activate receivers 18 and 17 during the positive-going portion thereof, which can be seen to persist for a time interval T1.

Similarly, multivibrator 26 produces waveform C having a positive portion occupying a time interval T2. Thus, receivers 18 and 17 are energized for a first time interval T1 following the transmitter trigger while receiver 23 is energized for a time interval T2 overlapping the interval T1 but extending for a predetermined time thereafter. Receiver 22 is continuously energized for the entire target reception interval.

Waveform D illustrates the composite detected noise output from receivers 17 and 18 during the time interval T1 during which they are simultaneously energized. Similarly, waveforms E and F respectively represent the detected noise outputs of receivers 23 and 22 during their individual periods of energization. Waveform G shows the combined detected noise output of video mixer 19 as applied to the input of video integrator 2.

The details of integrator 2 are shown in FIG. 2. The video output of mixer 19 is applied to summing circuit 30 via line 31. A second input to summing circuit 30 is derived from trigger generator 32 whose output of a first polarity is also made available on line 3 for application to trigger amplifier 4 of FIG. 1. A compensating voltage waveform, to be more fully described hereinafter, is applied by line 33 to a third input of summing circuit 30, a fourth input to which is obtained from the output of limiter 34. The combined video output of circuit 30 is applied to modulator 35 for purposes of modulating the output signal of a delay line carrier oscillator 36. The modulated output signal of modulator 35 is applied to I-F delay line 37 and after suitable amplification by means I-F amplifier 38, is detected in detector 39. The output of detector 39 is applied via delay line 41 and limiter 34 back to summing circuit 30.

The compensating waveform which is applied by line 33 to circuit 30 is shown in waveform J. It is arranged to have a polarity which is opposite to the polarity of the average value of the noise accompanying the video signal at the input 31 to summing circuit 30. By suitable adjustment of the respective polarities of the compensating waveform, video signal and trigger signal, limiter 34 passes for recirculation only the compensating waveform and the video signals. The trigger signal is passed, however, by limiter 42 which rejects the compensating waveform and the video signals produced at the output of detector 39.

The operation of the video integrator of FIG. 2 is as follows. Trigger generator 32 is a self-synchronized oscillator, that is, its output pulse produced on line 40 is synchronized with the occurrence of input trigger pulses derived from limiter 42. The time separation between the appearance of a pulse on line 40 and the arrival of the same pulse at limiter 42 is substantially determined in the trigger loop by the electrical length of delay line 37 which establishes the basic radar repetition rate in a well known manner. Target video signals, on the other hand, are applied via terminal 31 and are recirculated only around the video delay loop comprising circuit 30, modulator 35, delay line 37, amplifier 38, detector 39, delay line 41, and limiter 34. Video delay line 41 is adjusted so that its delay time is equal to the difference between the delays in the aforementioned trigger and video loops. Thus, a recirculating target pulse coherently adds in summing circuit 30 with its correspondingly succeeding target pulse whereby the resultant amplitude of the integrated target pulses is enhanced. Random components (i.e., noise and signals lacking coherence with the radar system trigger produced by generator 32), on the other hand, tend to cancel in the delay line integrating process.

Referring again to FIG. 3, the combined noise signal output waveform G of mixer 19 is applied via line 31 to summing circuit 30; waveform H represents the average value thereof.

Inasmuch as waveform H is coherent with the system triggers produced by generator 32, waveform H is integrated by the apparatus of FIG. 2 in the same fashion as the desired target video pulses are integrated. The resultant noise component, after integration, is shown in waveform I as it would appear at the output of detector 39. It can be seen that if waveform I were applied to the intensity modulation control of a PPI, such as PPI 24 of FIG. 1, the inherently limited dynamic range thereof would be severely burdened to the extent that the target display would not be uniformly visible throughout the entire range interval shown by the indicator.

The present invention provides means for effectively eliminating the objectionable average value of stepped waveform I by generating a compensating stepped voltage waveform which is then differentially combined in summing circuit 30 with waveform G of FIG. 3, thus precluding the production of waveform I.

Compensating waveform J is produced in FIG. 1 by combining the outputs of multivibrators 25 and 26 in summing circuit 43 via variable gain circuits 45 and 46, respectively. By reference to FIG. 3, it readily can be seen that waveform J results from inverting the summation of waveforms B and C. The resultant output of summing circuit 43 is inverted in phase inverter 44 and is applied via line 33 to the input of video integrator 2. Variable gain circuits 45 and 46 are adjusted, as by means of control knobs 47 and 48 so as to make the trace of PPI 24 uniformly brilliant, in the absence of a target signal, along its entire radial length. Such uniform brilliance denotes a substantially constant noise level as a function of range, in turn signifying that the noise-produced stepped waveform G has been effectively eliminated.

It can be seen from the preceding specification that the objects of the present invention have been achieved by the provision in a stacked-beam radar receiver of a compensating voltage waveform generator adapted to produce a composite waveform having portions which correspond in duration to the intervals of energization of the respective stacked-beam radar receivers. The compensating waveform is differentially combined with the composite video signal output of the stacked-beam radar receiver to produce a resultant signal containing substantially only the desired target signals and non-integrated noise.

While a representative signal integrator has been included in the preferred embodiment of FIG. 1, the present invention is also useful in stacked-beam radar receivers omitting such signal enhancing apparatus. The utility of the present invention, however, is more pronounced in a stacked-beam radar receiver utilizing video signal enhancing for the reason that the undesirable stepped noise waveform, caused by the sequential gating of the stacked-beam radar receivers, is emphasized when video signal enhancing apparatus is employed, thereby further aggravating an already deleterious effect.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a stacked-beam radar system, receiving means including individual means for detecting target signals and noise present in each of the respective beam channels, means for rendering said individual means operative during respective portions of the target reception interval, means for summing the detected target signals and the detected noise signals at the outputs of said individual means, means for generating a stepped waveform having portions synchronous in time and coextensive in duration with the intervals of operation of said individual means for detecting, said stepped waveform having amplitudes corresponding to the average amplitudes of the detected noise signal at the output of said summing means, and signal combining means adapted to receive the output signals of said summing means and said means for generating for differentially combining the two to produce a residual signal whereby the average value of the detected noise component of the residual signal is reduced substantially to zero.

2. Apparatus as defined in claim 1 wherein said means for generating a stepped waveform includes means for adjusting the amplitude of each portion thereof to substantially equal the average amplitude of the corresponding time portion of the detected noise signal at the output of said summing means.

3. In a stacked-beam radar system, receiving means including individual means for detecting target signals and noise present in each of the respective beam channels, means for rendering said individual means operative during respective portions of the target reception interval, means for summing the detected target signals and detected noise signals at the outputs of said individual means, means for generating a stepped waveform having portions synchronous in time and coextensive in duration with the intervals of operation of said individual means for detecting, said stepped waveform having amplitudes corresponding to the average amplitudes of the detected noise signal at the output of said summing means, and a signal integrator including signal combining means adapted to receive the output signal of said summing means and said stepped waveform and operative to differentially combine the two and to enhance those components of the resultant signal having repetition rates coherent with that of said radar system.

4. In a stacked-beam radar system, receiving means including individual means for detecting target signals and noise present in each of the respective beam channels, means for rendering said individual means operative during respective portions of the target reception interval, means for summing the outputs of said individual means, means for generating a stepped waveform having portions synchronous in time and coextensive in duration with the intervals of operation of said individual means for detecting, signal combining means adapted to receive the output signals of said summing means and said means for generating for differentially combining the two to produce a residual signal whereby the average value of the detected noise component of the residual signal is reduced substantially to zero, and a signal integrator adapted to receive the output of said combining means and operative to enhance the other of said residual signal components having repetition rates coherent with that of said radar system.

5. In a stacked-beam radar system, receiving means including individual means for detecting target signals and noise signals in each of the respective beam channels, means for rendering said individual means operative during respective portions of the target reception interval, means for summing the outputs of said individual means, a signal integrator adapted to receive the output of said summing means and operative to enhance those received signal components having repetition rates coherent with that of said radar system, means for generating a stepped waveform having portions synchronous in time and coextensive in duration with the intervals of operation of said individual means for detecting, said stepped waveform having amplitudes corresponding to the average amplitudes of the detected noise signal at the output of said summing means, said waveform being of a polarity opposite to that of the average value of the detected noise signal output of said summing means, and means for applying said waveform to the input of said signal integrator whereby the average value of said detected noise signal is reduced substantially to zero prior to integration.

6. Apparatus as defined in claim 5 wherein said means for rendering said individual means operative includes at least one gate generator, each of which produces an output waveform having the same origin in time but different termini in time, the output of each of said gate generators being connected to a respective one of said individual means for detecting for rendering it operative during the time between said origin and terminus of the respective output waveforms.

7. Apparatus as defined in claim 6 wherein said means for generating said stepped waveform includes said gate generators, means for summing the outputs thereof, means for inverting said summed outputs, and means for applying said inverted output to the input of said signal integrator.

References Cited in the file of this patent
UNITED STATES PATENTS

| | | |
|---|---|---|
| 2,310,692 | Hansell | Feb. 9, 1943 |
| 2,487,995 | Tucker | Nov. 15, 1949 |
| 2,659,081 | Allen et al. | Nov. 10, 1953 |